United States Patent [19]

Johnson

[11] Patent Number: 4,968,976

[45] Date of Patent: Nov. 6, 1990

[54] ALARM KIT FOR A CHEMICAL TANK OF A NONCOMMERCIAL WATER PURIFICATION SYSTEM

[76] Inventor: James I. Johnson, 1654 Crofton Blvd., Ste. 6, Crofton, Md. 21114

[21] Appl. No.: 201,424

[22] Filed: Jun. 2, 1988

[51] Int. Cl.$^5$ ............................................. G08B 21/00
[52] U.S. Cl. ................................... 340/624; 340/625; 73/308
[58] Field of Search .................. 340/623, 624, 625; 200/84 R, 84 A; 73/305, 307, 308, 317, 319

[56] References Cited

U.S. PATENT DOCUMENTS

| | | | |
|---|---|---|---|
| 1,712,665 | 5/1929 | Gregory | 200/84 R |
| 2,196,955 | 4/1940 | Buntyn | 137/68 |
| 2,701,355 | 2/1955 | Rinehart et al. | 414/17 |
| 2,717,990 | 9/1955 | Person | 340/624 |
| 2,719,196 | 9/1955 | Wright | 200/84 R |
| 2,777,030 | 1/1957 | MacGriff et al. | 200/84 |
| 2,915,605 | 12/1959 | Friedell | 200/84 |
| 3,253,891 | 5/1966 | Hiers | 23/272 |
| 3,415,958 | 12/1968 | Mauro | 200/84 R |
| 3,480,749 | 11/1969 | Greutman | 200/84 R |
| 4,091,365 | 5/1978 | Allen | 340/625 X |
| 4,187,503 | 2/1980 | Walton | 340/624 |
| 4,518,503 | 5/1985 | Fermaglich | 210/662 |
| 4,757,305 | 7/1988 | Peso | 340/624 |

Primary Examiner—Joseph A. Orsino
Assistant Examiner—Jeffery A. Hofsass

[57] ABSTRACT

An alarm kit for notifying a user of a noncommercial water purification system that the level of liquid with the chemical tank of the system is below a predetermined level includes a float, a housing, an alarm, an activation device and a connection member. This alarm kit can be easily installed by a homeowner or other user of the system and will allow the user to avoid complete depletion of the liquid from the chemical tank. The float either floats on top of the liquid or is submerged therein and will cause movement of the connection member when the liquid level drops below the predetermined level. The connection member will then pivot an arm of the activation device to cause the alarm to be activated in order for the user to be alerted that the liquid within the tank needs to be replaced. The predetermined level is determined by the usual rate of withdrawal of liquid from the tank and the usual time required to replenish the fluid, such as the response interval of a vendor to a request for service.

15 Claims, 1 Drawing Sheet

U.S. Patent    Nov. 6, 1990    4,968,976
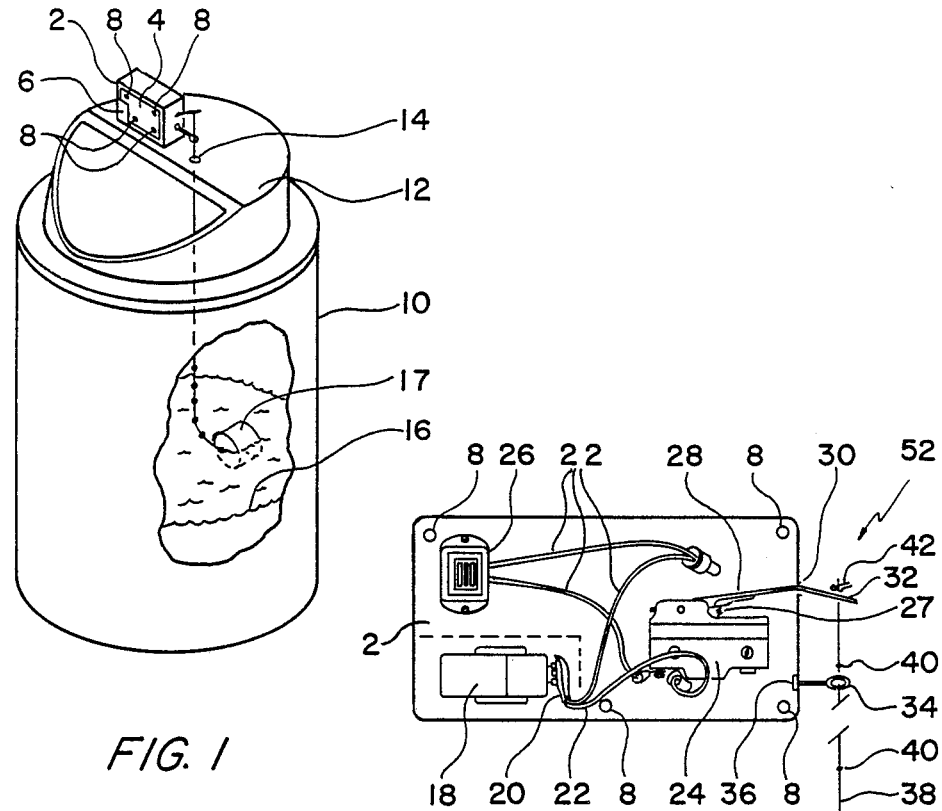
FIG. 1
FIG. 2
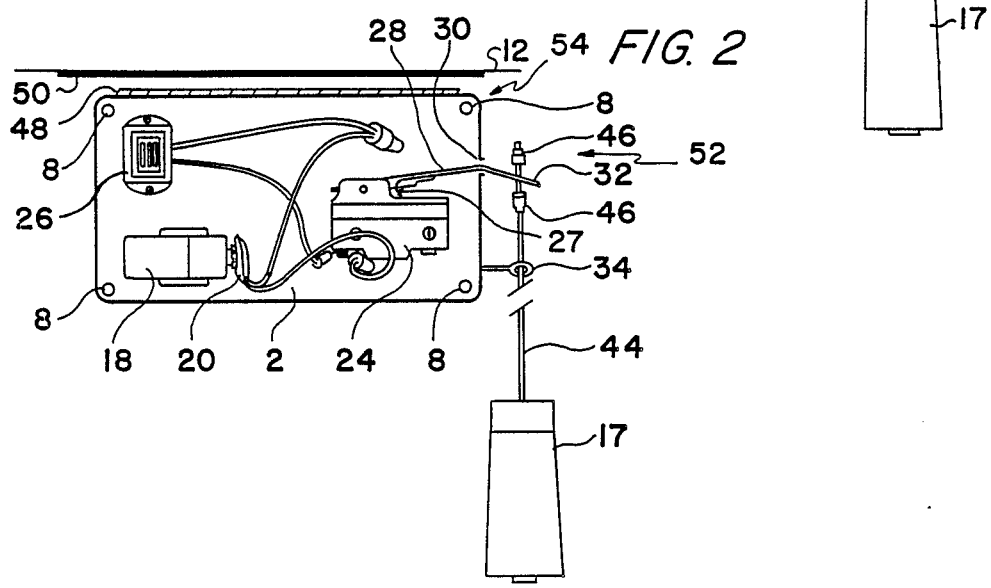
FIG. 3

ALARM KIT FOR A CHEMICAL TANK OF A NONCOMMERCIAL WATER PURIFICATION SYSTEM

BACKGROUND OF THE INVENTION

1. Field of the Invention

The present invention relates to an alarm kit for a noncommercial water purification system. This kit permits a homeowner or other user of the system to be notified that the liquid within the chemical tank is about to be depleted and the user can, therefore, timely replace this liquid before it is completely depleted.

2. Description of the Background Art

Various alarm systems are known in the prior art. However, these arrangements do not disclose an alarm kit which may be easily installed by a homeowner or other user of the water purification system and which will notify the user when the liquid within the chemical tank is about to be depleted. Conventionally, noncommercial water purification systems lack any form of alarm system, and as such, a user will not be aware that liquid within the chemical tank is about to be depleted until all of this liquid is gone. Then, the water may take on a foul taste or unpleasant color and the user is forced to contend with this condition of water until the liquid within the chemical tank may be replaced. Such is normally done by a service, and as such, it may take an undesirably long period of time before the liquid is replenished in the tank.

While alarm systems are known, most conventional systems have not been applied to chemical tanks of a water purification system as set forth above. Such alarms are rather complicated to install and often are expensive and accordingly, would not lend themselves to a noncommercial setting in which a homeowner or other user would prefer to self-install such alarms. Furthermore, such relatively sophisticated alarms may be difficult to maintain.

Accordingly, a need in the art exists for a simple and effective alarm kit for a chemical tank of a noncommercial water purification system. This device should be easy to install and require only limited maintenance. Further, this device should enable a user to be timely informed that liquid within the chemical tank is about to be depleted so that action may be taken to preclude total depletion and loss of conditioning of the drinking water.

SUMMARY OF THE INVENTION

Accordingly, it is the primary object of the present invention to provide an alarm kit which will timely notify a homeowner or other user of a noncommercial water purification system that the liquid within a chemical tank is about to be depleted and will, therefore, enable the user to take corrective action to maintain the proper amount of chemicals within the tank.

It is another object of the present invention to provide an alarm kit which is easily installed on a chemical tank.

Yet, another object of the present invention is to provide an alarm kit which is easy to maintain and inexpensive to manufacture.

These and other objects of the present invention are fulfilled by providing an alarm kit comprising a float means placed within the chemical tank for interacting with the fluctuations in the level of the body of liquid therein. When a predetermined level is reached, the float means will cause an interconnection means to move whereby an activation means will cause an alarm means to be activated. The alarm means, activation means, and a part of the interconnection means are all connected within a housing located proximate to the top surface of the tank. The predetermined level for the body of liquid is determined by a formula using the usual rate of withdrawal for the liquid, as well as the time normally required to refill the tank. This arrangement, therefore, permits the user to timely be notified of impending depletion of liquid within the chemical tank and to, therefore, take action to refill this tank before all liquid has been withdrawn.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a perspective view of a chemical tank having the alarm kit of the present invention attached thereto;

FIG. 2 is a cross-sectional view of the alarm kit of the present invention showing an arrangement with the alarm kit being attachable onto the top of the chemical tank and having a flexible interconnection means to a float within the tank; and FIG. 3 is a cross-sectional view similar to FIG. 2 of the present invention, but showing the alarm kit attached beneath the top surface of the chemical tank and having a rigid interconnection means to a float within the tank.

DETAILED DESCRIPTION OF THE PREFERRED EMBODIMENTS

Referring in detail to the drawings, and with particular reference to FIG. 1, an alarm kit for a chemical tank of a noncommercial or residential water purification system is shown. This alarm kit includes a housing 2 having a face plate 4 with fastening means 8 for affixing the face plate 4 to the housing 2. These fastening means 8 may include screws as indicated in FIG. 1 or any other suitable connection means, such a snap-on face. The face plate 4 shown in FIG. 1 additionally has a removable panel 6 in one corner thereof. This removable panel 6 can provide quick access to the interior of the housing. For instance, if a battery is used as a power source, as will be described below, this removable panel 6 permits this battery to be easily changed. However, this removable panel 6 may be omitted and access to the material of the housing 2 may be permitted by simply removing the face plate 4.

As seen in FIG. 1, the housing 2 sits on the top surface 12 of chemical tank 10. This tank 10 has an opening 14 therein. This opening 14 may be easily punched into the top of the tank 10 by a homeowner or other user of the system as the top of tank 10 is usually plastic. However, this opening 14 may also be drilled into the top surface 12 of tank 10. Additionally, this opening 14 may already be present in the top surface 12 of the chemical solution tank 10 as an opening for the suction line for the chemical feeder or as a fill hole.

Within the chemical solution tank 10, a body of liquid is provided. This liquid has a surface level 16, which will fluctuate as the liquid is withdrawn from and replenished into the tank 10. This liquid may consist of a solution or caustic soda or sodium chloride and water or any other suitable fluids. Such chemicals are normally used in the chemical tank within a noncommercial water purification system.

The surface level 16 of the liquid can fluctuate from the top of the tank to the bottom thereof, and will pass through a predetermined level. This predetermined level of the liquid within the tank which is determined by certain factors which include the normal rate of withdrawal of liquid from the tank and the time it takes to refill the tank with liquid. By using these factors, the predetermined level may be set such that sufficient time is provided for refilling the tank before the liquid is completely withdrawn therefrom. As an outside source or vendor will typically provide the chemicals for the tank 10, the normal time for refilling is usually measured as a matter of days. Accordingly, by appropriately setting the predetermined level, a homeowner or other user of the water purification system may avoid complete depletion of the liquid within the chemical tank and its undesirable effects. In particular, when the liquid within tank 10 is completely depleted, the taste and/or coloration or the water may be adversely affected. By ensuring that the homeowner or other user of the water purification system can maintain sufficient liquid within the chemical tank 10, proper operation or the water purification system is ensured and unwanted liquid depletion in chemical tank 10 and attendant loss of the water conditioning function of the system can be avoided.

The alarm kit of the present invention includes a float means 17 which will float on the surface level 16 of the liquid as shown in FIG. 1 or will be submerged therein, as will be described hereinafter. As seen in FIG. 2, this float means 17 is connected to an activation means 24 by interconnection means 52. This interconnection means includes the movable arm 28 and a flexible line 38 as will be described below.

Referring further to FIG. 2, within housing 2, a power source 18 is provided. This power source may be a battery as described above or any other suitable drive means. A detachable connection 20 is provided for connecting the battery 18 to the electrical connection means 22. These electrical connection means or wires connect an activation means (microswitch 24), alarm means 26, and power source 18. The microswitch 24 acts as an activation means for the alarm means 26 by constraining the movable arm 28 to pivot against the force of spring 27 to cause the alarm means 26 to be actuated. This alarm may emit an audible or visible alarm indication or combination of audible and visible alarm indications whereby the user of the water purification system will be informed that the liquid within the chemical tank is about to be depleted unless serviced within an anticipated interval.

The movable arm 28 extends through an opening 30 in the housing 2. A seal means 31 is provided about this opening whereby the interior of housing 2 may be water tight. This seal means 31 may be optionally omitted if leakage of water into the housing 2 is unlikely. The arm 28 has an outer end 32 which connects to the flexible line 38 as shown in FIG. 2. A guide 34 is provided on the outside of the housing 2 for guiding the flexible lines 38. An attachment 36 is provided for the guide 34. This attachment may be a screw and nut arrangement whereby the guide is simply screwed into the housing. Alternatively, as indicated in FIG. 3, the guide 34 may be integrally formed within the housing 2 or this guide 34 may be entirely omitted.

As seen in FIG. 2, the flexible line 38 extends from the outer end 32 of arm 28 to the float 17. A pin 42 is provided for detachably affixing the flexible line 38 to the end 32 of arm 28. This pin will engage an upper detent or knot 40 in the flexible line 38. A hole may be provided in the outer end 32 of arm 28 through which the flexible line 38 passes, or any other suitable attachment arrangement may be used. By removing pin 42, the length of the flexible line 38 may be adjusted.

As indicated in FIG. 2, a plurality of detents or knots 40 are provided along the length of the flexible line 38. While these detents or knots 40 are indicated as extending completely along the flexible line 38 to the float means 17, it is not necessary that these detents or knots 40 extend over the entire length of this flexible line 38. Rather, these knots or detents 40 may merely be provided at an upper end of the flexible line 38 if so desired.

By providing the detents or knots 40 along at least a portion of the length of the flexible line 38, the length of the flexible line 38 between the outer end 32 of arm 28 and the float means 17 may be adjusted. In this manner, the alarm kit may be adjusted to a particular chemical tank 10 as desired. For instance, a tank 10 holding more liquid may require a greater length of flexible line 38 before the predetermined level is reached. Likewise, if liquid is rapidly drawn from the tank or if an extended period is required for a service person to refill the tank, the length of this flexible line between the outer end 32 of arm 28 and the float 17 may be adjusted to accommodate for subfactors. Thus, the predetermined level may be uniquely set to the specific water purification system by a homeowner or other user.

As illustrated in FIG. 1, the float means 17 will normally float along the surface level 16 of the liquid in talk 10. As this surface level 16 lowers when liquid is withdrawn from the chemical tank 10, the float means 17 will move downwardly and will tend to move towards the center of the tank 10. Eventually, the float means 17 will disengage from the liquid. This action will cause the weight of the float means 17 to move the flexible line 38 downwardly. This movement causes arm 28 to pivot downwardly against the bias of spring 27. Upon this pivoting, the activation means or microswitch 24 will cause alarm means 26 to emit an alarm. Thus, the predetermined level may be set such that when the liquid in the chemical tank reaches a certain level, the alarm means will be activated. Thus, a user of the system may be notified that the liquid within the tank needs to be replenished.

Referring now to FIG. 3, another embodiment of the alarm kit is shown. In this embodiment, a rigid rod 44 is used in place of the flexible line 38. Rod to arm connectors 46 are provided for holding the rod 44 at the outer end 32 of the arm 28. These connectors 46 may be adjustable to permit selective adjustment of the length of rod 44 between the end 32 of the arm 28 and the float means 17. Thus, this interconnection means 52 will also selectively determine where the predetermined liquid level for the chemical tank will be located such that the alarm kit may be specifically adapted to a particular water purification system.

The arrangement of FIG. 3 operates by the float means 17 initially being submerged beneath the surface 16 of the liquid within the chemical tank 10. As the float means 17 tends to float, the rigid rod 44 will be urged upwardly and arm 28 will be held in a raised position. However, when the liquid within the tank 10 falls beneath a certain level, the float means 17 will eventually reach the surface of this liquid. The float means 17 will continue to float on the liquid until sufficient liquid is withdrawn from the chemical tank such that the float means 17 is no longer in contact with the liquid. The weight of the float means 17 will then cause downward movement of the rigid rod 44. This movement will result in arm 28 pivoting downwardly and the activation means or microswitch 24 activating alarm 26. Thus, this arrangement works similar to that shown in FIG. 2. The spring 27 in the FIG. 3 embodiment may be omitted if so desired.

As illustrated in FIG. 2, an outline for the removable panel 6 is shown in dotted line. This removable panel 6 will permit the power source or battery 18 to be easily replaced. As further indicated in FIG. 3, a removable panel 6 is not used and access to the interior of the housing 2 is gained by removing the fastening means 8 and the face plate 4.

The alarm kit embodiment of FIG. 3 further comprises an attachment device 54. This device includes a fastening means 48 on the top surface of the housing 2. This fastening means 48 will attach to a second fastener 50 on the inside surface on the top of tank 10. Thus, the entire alarm kit assembly may be housed within the chemical tank 10 as shown in FIG. 3. Further, while the FIG. 2 arrangement does not show an attachment device 54, it should be appreciated that fasteners 48 on the housing and fasteners 50 on the top surface 12 of tank 10 could be used if so desired.

While this FIG. 3 arrangement indicates that the rigid rod 44 is used, it should be appreciated that a flexible line 38 could be substituted for this rod 44. Similarly, the FIG. 3 arrangement may use a removable panel 6 for access to the battery or power source 18. It should additionally be noted that the arrangement of FIG. 2 will normally rest on top of the top surface 12 of the tank 10. However, this arrangement of FIG. 2 may also have fasteners 48 and 50 such that it may reside within the chemical tank. It is additionally noted that the FIG. 3 arrangement lacks the sealable means 31 indicated in the FIG. 2 embodiment. It should be appreciated that either arrangement may have a seal means or omit this seal means 31. Thus, it can be seen that many modifications may be made to the arrangements shown in FIGS. 2 and 3 without departing from the spirit and scope of the instant invention.

As will be apparent for the foregoing description, the instant alarm kit provides for a means for notifying a homeowner or other user of a noncommercial water purification system that liquid within a chemical tank has reached a predetermined level and it now time to replace or arrange for the replacement of these chemicals. This arrangement avoids the unpleasant situation of running out of liquid within the tank and ensures that a user may maintain a supply of liquid within this tank. The instant invention further provides for an alarm kit which may be easily mounted on the surface of the top 12 of tank 10 or may be readily placed inside this tank. While a fastening means 50 has been indicated on the top of tank 12, it should be apparent that any easily installed fastener 50 may be used. For instance, a peel-away adhesive strip may be provided on the back of this fastener 50 whereby modification to the tank top 12 is avoided. The cooperating portions 48 and 50 of the fastener 54 may comprise, for example, the components of the well known "Velcro" fasteners which are commercially available. However, other means for affixing this fastener 50 to the top of the tank 20 may be provided.

The alarm kit of the instant invention provides for an inexpensive and easy to manufacture kit. This simple construction yields a reliable device while ensuring proper monitoring of the liquid within the chemical tank.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. An alarm kit for a chemical tank of a liquid purification system, said chemical tank having a generally horizontal surface covering said chemical tank and said chemical tank holding a fluctuating body of liquid used in purification of water, said kit comprising:
   float means placed within said chemical tank for interacting with fluctuations in a level of said body of liquid to at least a predetermined lower level thereof, said predetermined lower level being determined by a predetermined rate of withdrawal from said liquid from said tank, and a predetermined service interval required to refill said tank;
   means for positioning a housing on a side of said horizontal surface of the tank without modification to said horizontal surface, said housing being readily detachable from said horizontal surface of said tank;
   alarm means contained within said housing for emitting an alarm when the level of said body of liquid reaches said predetermined lower level thereby indicating that said body of liquid needs to be replenished;
   activation means for actuating said alarm means; and
   interconnection means for connecting said float means to said activation means through an opening in said horizontal surface whereby said activation means is responsive to said float means for causing said alarm means to be activated when said body of liquid reaches said predetermined level; said housing having a top and a bottom and at least one side therebetween, said bottom being closed and said side of said housing having an opening defined therein for permitting said interconnection means to extend therethrough.

2. The alarm kit as recited in claim 1, further comprising a power source contained within said housing for driving said alarm means when said alarm means is actuated, said housing further having a removable portion whereby upon removal of said removable portion, said power source is exposed.

3. The alarm kit as recited in claim 2, wherein said power source is a removable battery.

4. The alarm kit as recited in claim 1, wherein said housing has a seal at said opening whereby, said housing forms a watertight container for at least said alarm means, said activation means and a portion of said interconnection means being contained within said housing.

5. The alarm kit as recited in claim 1, wherein said interconnection means comprises a pivotable arm attached to said activation means and a connection member extending between an end of said arm to float means, said arm extending through an opening in said housing and said end of said arm and said connection member being located outside of said housing, said connection member being detachably affixed to said end of said arm by an attachment device.

6. The alarm kit as recited in claim 5, wherein said connection member is a flexible line which permits said float means to float on the top of said body of liquid until said liquid approaches said predetermined lower level, whereafter, as said liquid further recedes, said float will cause said flexible line to move downwardly and to pivot said arm to thereby actuate said activation means.

7. The alarm kit as recited in claim 6, wherein said flexible line has a plurality of detents spaced therealong, said detents interacting with said attachment device to detachably affix said line to said end of said arm at selected positions whereby said predetermined lower level can be adjusted.

8. The alarm kit as recited in claim 5, wherein said connection member is a rigid rod which forces said float to be submerged in said body of liquid when said liquid is above said predetermined level and which permits said float to move downwardly when said liquid approaches said predetermined lower level, whereafter when said liquid further recedes, said float will move downwardly and cause said rod to move downwardly and said arm to pivot to thereby actuate said alarm via said activation means.

9. The alarm kit as recited in claim 8, wherein said attachment device permits selective adjustment of said rod relative to said end of said arm to thereby adjust said predetermined lower level.

10. The alarm kit as recited in claim 5, wherein said housing has a guide on a side of said housing having the opening therein, said guide slidably holding a top portion of said connection member.

11. The alarm kit as recited in claim 5, further comprising means for urging said pivotable arm upwardly, said means for urging yielding to downward movement of said connection member when the float moves the connection member in response to said liquid approaching said predetermined lower level.

12. The alarm kit as recited in claim 1, wherein said alarm indication emitted by said alarm means is a visual indication.

13. The alarm kit as recited in claim 1, wherein said alarm indication emitted by said alarm means is an audible indication.

14. The alarm kit as recited in claim 1, wherein said alarm indication emitted by said alarm means is a combination of visual and audible indications.

15. The alarm kit as recited in claim 1, wherein said housing is located on an exterior side of the said horizontal surface of said tank by said positioning means and said interconnection means extends through a hole defined in said horizontal surface of the tank, whereby a portion of said interconnection means as well as said float means are contained within said tank.

* * * * *